(12) United States Patent
Schwalm

(10) Patent No.: US 6,350,523 B1
(45) Date of Patent: *Feb. 26, 2002

(54) RADIATION-CURABLE WEATHER-RESISTANT COMPOSITIONS COMPRISING CARBONATE (METH) ACRYLATES

(75) Inventor: Reinhold Schwalm, Wachenheim (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,929

(22) Filed: Jun. 17, 1999

(30) Foreign Application Priority Data

Jun. 18, 1998 (DE) .......................... 198 27 084

(51) Int. Cl.⁷ ..................... B32B 27/30; B32B 27/40
(52) U.S. Cl. .................... 428/423.1; 428/457; 428/461; 428/522; 522/182; 427/496; 427/508
(58) Field of Search ............... 428/31, 411.1, 428/423.1, 413, 500, 522, 461, 457; 522/182; 427/496, 508, 498, 512

(56) References Cited

U.S. PATENT DOCUMENTS

| | | | | |
|---|---|---|---|---|
| 4,230,548 A | * | 10/1980 | Adelmann et al. | 522/163 |
| 4,344,982 A | * | 8/1982 | Chen | 427/44 |
| 4,639,472 A | | 1/1987 | Green et al. | 522/101 |
| 4,767,620 A | * | 8/1988 | Mauz et al. | 424/78 |
| 5,479,555 A | * | 12/1995 | Rot et al. | 385/145 |
| 5,827,928 A | * | 10/1998 | Morimoto et al. | 525/217 |

FOREIGN PATENT DOCUMENTS

| | | |
|---|---|---|
| EP | 0 092 269 | 10/1983 |
| EP | 0 787 749 | 8/1997 |
| JP | 62-132570 | 6/1987 |
| WO | WO 92/17337 | 10/1992 |

OTHER PUBLICATIONS

Encyclopedia of Polymer Science and Engineering, 1985.*

Patent Abstracts of Japan, vol. 17, No. 551 (C–1117), JP 5–155729, Jun. 22, 1993.

* cited by examiner

*Primary Examiner*—Paul Thibodeau
*Assistant Examiner*—D. Lawrence Tarazano
(74) *Attorney, Agent, or Firm*—Oblon, Spivak, McClelland, Maier & Neustadt, P.C.

(57) ABSTRACT

The use of radiation-curable compositions containing from 0.5 to 100% by weight of carbonate (meth)acrylates, based on the overall amount of radiation-curable compounds, as coating compositions for exterior applications.

16 Claims, No Drawings

RADIATION-CURABLE WEATHER-RESISTANT COMPOSITIONS COMPRISING CARBONATE (METH) ACRYLATES

The invention relates to the use of radiation-curable compositions comprising from 5 to 100% by weight, based on the overall amount of radiation-curable compounds, of carbonate (meth)acrylates as coating compositions for exterior applications.

Radiation-curable compositions have to date been used predominantly for the coating of wood, paper and plastics in the interior sector. Exterior applications require resistance to the effects of weathering, which for example means low yellowing tendency, stability to hydrolysis, mechanical stability under weathering conditions, especially stability to cracking, and also acid and other chemical resistance.

In addition to the required weathering stability there is a desire for good processing properties, such as minimal odor nuisance and high reactivity, and also good mechanical properties in the resultant coatings, such as high flexibility and hardness.

Radiation-curable compositions known to date, as disclosed for example by JP 62-132570 and WO 92/17337, do not go far enough toward meeting the above requirements.

EP-A-92 269 and DE-A-27 57 086 disclose carbonate (meth)acrylates. Exterior applications are not described.

It is an object of the present invention to provide weathering-resistant, radiation-curable compositions for exterior applications, having high weathering stability, good processing properties and, at the same time, good mechanical properties.

We have found that this object is achieved by the use of the above compositions.

The radiation-curable compositions contain from 0.5 to 100% by weight, preferably from 5 to 80% by weight and, with particular preference, from 10 to 50% by weight of carbonate (meth)acrylates. These percentages by weight are based on the sum of radiation-curable compounds.

The carbonate (meth)acrylates contain on average preferably from 1 to 5, in particular from 1 to 3, and, with particular preference, 2 or 3 carbonate groups.

The carbonate (meth)acrylates contain on average preferably from 1 to 5, in particular from 2 to 4 and, with particular preference, 2 or 3 (meth)acrylic groups, and with very particular preference 2 (meth)acrylic groups.

The number-average molecular weight $M_n$ of the carbonate (meth)acrylates is preferably less than 3000 g/mol, with particular preference less than 1500 g/mol and, with very particular preference, less than 800 g/mol (as determined by gel permeation chromatography using polystyrene as standard and tetrahydrofuran as solvent).

The carbonate (meth)acrylates are readily obtainable by transesterifying carbonic esters with polyhydric, preferably dihydric, alcohols (diols, such as hexanediol) and subsequently esterifying the free OH groups with (meth)acrylic acid or else by a transesterification with (meth)acrylic esters, as is described, for example, in EP 92 269. They can also be obtained by reacting phosgene, urea derivatives with polyhydric alcohols, such as dihydric alcohols, for example.

Particularly preferred carbonate (meth)acrylates are those of the formula:

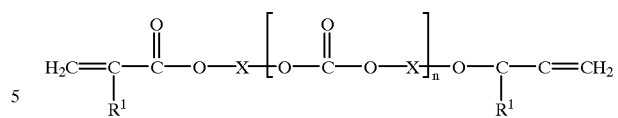

where $R^1$ is H or $CH_3$, X is a $C_2$–$C_{18}$ alkylene group and n is an integer from 1 to 5, preferably from 1 to 3.

$R^1$ is preferably H, and X is preferably $C_2$–$C_{10}$ alkylene, with particular preference $C_4$–$C_8$ alkylene. With very particular preference, X is $C_6$ alkylene.

These compounds are preferably aliphatic carbonate (meth)acrylates.

In addition to the carbonate (meth)acrylates the radiation-curable composition may include further radiation-curable compounds.

Particularly suitable are urethane (meth)acrylates, epoxy (meth)acrylates and melamine (meth)acrylates.

Urethane (meth)acrylates, for example, are obtainable by reacting polyisocyanates with hydroxyalkyl (meth)acrylates with or without chain extenders such as diols, polyols, diamines, polyamines or dithiols or polythiols. Urethane acrylates which can be dispersed in water without the addition of emulsifiers additionally comprise ionic and/or nonionic hydrophilic groups, which are introduced into the urethane acrylate by means, for example, of structural components such as hydroxycarboxylic acids.

The urethane (meth)acrylates preferably have a number-average molecular weight $M_n$ of from 500 to 20,000, in particular from 750 to 10,000 and, with particular preference, from 750 to 3000 g/mol (as determined by gel permeation chromatography using polystyrene as standard).

The urethane (meth)acrylates preferably have a content of from 1 to 5, with particular preference from 2 to 4, mols of (meth)acrylic groups per 1000 g of urethane (meth)acrylate.

Preferred structural components of the urethane (meth)acrylates are $C_1$–$C_8$-hydroxyalkyl (meth)acrylates, $C_2$–$C_8$-alkanediols or -polyols or $C_2$–$C_8$-alkylamines as chain extenders; the urethane acrylates can also include polyesterols or polyetherols as structural components; preferred polyisocyanates are dicyclohexylmethane 4,4'-diisocyanate, hexamethylene diisocyanate, isophorone diisocyanate, tetramethylene diisocyanate, trimethylhexamethylene diisocyanate, adducts of such isocyanates with polyhydric alcohols such as trimethylolpropane, dimers or trimers of the isocyanates, such as biurets or isocyanurates.

Preference is given to aliphatic polyisocyanates, the term aliphatic being intended to include nonaromatic alicyclic compounds as well.

Preferred urethane (meth)acrylates are aliphatic urethane acrylates, which contain aromatic ring systems if at all, in minor amounts of, for example, less than % by weight, based on the urethane acrylates, and which with particular preference contain no aromatic ring systems.

Epoxide (meth)acrylates are obtainable by reacting epoxides with (meth)acrylic acid. Examples of suitable epoxides are epoxidized olefins or glycidyl ethers, examples being bisphenol A diglycidyl ether, or aliphatic glycidyl ethers, such as butanediol diglycidyl ether.

Melamine (meth)acrylates are obtainable by reacting melamine with (meth)acrylic acid.

The epoxy (meth)acrylates and melamine (meth)acrylates preferably have a number-average molecular weight $M_n$ of from 500 to 20,000, with particular preference from 750 to 10,000, and, with very particular preference, from 750 to 3000 g/mol; the content of meth(acrylic) groups is preferably from 1 to 5, with particular preference from 2 to 4, mol per 1000 g of epoxy (meth)acrylate or melamine (meth) acrylate (gel permeation chromatography, PS standard, THF solvent).

Preferred radiation-curable compositions comprise from to 80% by weight, with particular preference from to 50% by weight, of carbonate (meth)acrylates a) and from 20 to 95% by weight, with particular preference from 50 to 90% by weight, of urethane (meth)acrylates, epoxy (meth)acrylates or melamine (meth)acrylates b).

In addition to the above (meth)acrylic compounds the radiation-curable composition may include other ethylenically unsaturated, free-radically polymerizable compounds.

Mention may be made in particular of compounds c), which have at least one (meth)acrylic group but are different from the above (meth)acrylic compounds a) and b).

Suitable compounds c) are poly(meth)acrylates of aliphatic polyols, especially di- to pentahydric alcohols, which other than the hydroxyl groups contain no further functional groups or, at best, ether groups.

Examples of such alcohols are bifunctional alcohols, such as ethylene glycol, and propylene glycol, and the representatives with higher degrees of condensation, such as diethylene glycol, triethylene glycol, dipropylene glycol, tripropylene glycol, etc., butanediol, pentanediol, hexanediol, neopentyl glycol, cyclohexanedimethanol, trifunctional alcohols and alcohols of higher functionality, such as glycerol, trimethylolpropane, butanetriol, trimethylolethane, pentaerythritol, ditrimethylolpropane, dipentaerythritol, sorbitol, mannitol and the corresponding alkoxylated alcohols, especially ethoxylated and propoxylated alcohols.

Suitable poly(meth)acrylates in particular have a molecular weight of less than 1000 g/mol, with particular preference of less than 600 g/mol, and have from 2 to 4 (meth) acrylic groups in the molecule; in other words, they are di-, tri- or tetraacrylates.

Further compounds c) having at least one (meth)acrylic group and being different from a) and b) are, for example, polyester (meth)acrylates, or else mono(meth)acrylates, such as butyl acrylate, cyclohexyl acrylate, etc. Monoacrylates are employed in particular as additional reactive diluents.

With all of the above compounds, the acrylic compounds are fundamentally preferred over the methacrylic compounds.

The radiation-curable compositions may also comprise radiation-curable compounds d) without acrylic groups. Suitable examples are vinyl- or alkyl-containing compounds, such as vinyl esters, aromatic vinyl compounds, such as styrene, vinyl ethers, their oligomers or polymers, and also unsaturated polyesters, etc.

Preferably, the overall amount of the radiation-curable compounds is composed as follows:
from to 80, with particular preference from 10 to 50% by weight of a),
from 20 to 95, with particular preference from 50 to 90% by weight of b),
from 0 to 50, with particular preference from 0 to % by weight of c),
from 0 to 50, with particular preference from 0 to 10% by weight of d).

Preferably, the radiation-curable compositions contain little if any aromatic components. The content of aromatic carbons (that is, carbons which are part of an aromatic ring system) is preferably below 5% by weight, with particular preference below 2% by weight, and, with very particular preference, below 0.5% by weight based on the overall amount of the radiation-curable compounds. In particular it is 0%.

The radiation-curable compounds can be present in the radiation-curable compositions in solvent-free form, dissolved in organic solvents, or dispersed in water.

Preference is given to solvent-free systems and especially to aqueous systems.

To this end, the radiation-curable compounds can be dispersed in water with the aid of emulsifiers or protective colloids, where the compounds are not already self-dispersible by virtue of containing hydrophilic groups.

The radiation-curable compositions preferably include at least one photoinitiator for the photochemical polymerization of free-radical polymerizable compounds.

Suitable examples are mono- or bisacylphosphine oxides, benzophenones, hydroxyacetophenones, phenylglyoxylic acid and its derivatives, or mixtures of these photoinitiators.

The radiation-curable compositions contain preferably from 0.1 to parts by weight of photoinitiators, with particular preference from 1 to 3 parts by weight of photoinitiators, based on 100 parts by weight of radiation-curable compounds.

In addition to the photoinitiators and radiation-curable compounds, the radiation-curable compositions may comprise further constituents. Particular mention may be made of pigments, flow control agents and stabilizers. For applications in the exterior sector—that is, for coatings which are directly exposed to daylight—the compositions will in particular comprise UV absorbers and free-radical scavengers.

UV absorbers convert UV radiation into thermal energy. Known UV absorbers are hydroxybenzophenones, benzotriazoles, cinnamic esters, and oxalanilides.

Free-radical scavengers bind free radicals which form as intermediates. Important free-radical scavengers are sterically hindered amines, which are known as HALS (Hindered Amine Light Stabilizers).

For exterior applications, the content of UV absorbers and free-radical scavengers is preferably in each case from 0.1 to 5 parts by weight, with particular preference from 0.5 to 3 parts by weight and, with very particular preference, from 2 to 3 parts by weight per 100 parts by weight of the radiation-curable compounds.

In addition, the radiation-curable composition may, as well as radiation-curable compounds, include other compounds which contribute to curing by means of different chemical reactions. Suitable examples are polyisocyanates, which crosslink with hydroxyl groups or amino groups.

The radiation-curable compositions are suitable for use as coating compositions which are employed in the exterior sector and which, therefore, are exposed to daylight.

Examples of such applications are the exterior coating of buildings or parts of buildings, especially facings or roof tiles, coatings on vehicles, especially on motor vehicles such as passenger cars, and trucks (in short, automobiles), rail vehicles, and aircraft.

The radiation-curable compositions are used in particular as a clearcoat (also called topcoat) of motor vehicles. The clearcoat of a motor vehicle is the outermost finish coat, which is exposed to weathering.

In this context, the radiation-curable compositions can be used to coat vehicle bodies or individual parts of vehicles consisting, for example, of metal or plastic. The radiation-curable compositions can also be coated onto films and these films can in turn be bonded adhesively to the vehicle, e.g., to the bodywork or parts of a vehicle.

The substrates to be coated can be metallic substrates, plastics, especially in the form of films and sheets, wood, or ceramic substrates.

The radiation-curable coating compositions can be applied to the coating substrates by known methods. Application techniques such as spraying, rolling and knife coating are particularly appropriate.

Curing can take place by radiation curing with UV light, with the UV fraction of daylight possibly being sufficient under certain circumstances. Preferably, however, commercial UV lamps are used for radiation curing. Curing can also take place by means of electron beams.

The coatings produced with the radiation-curable compositions exhibit high resistance to the effects of weathering, in particular a low yellowing tendency, high stability to hydrolysis, and very good mechanical properties, especially high flexibility and hardness.

EXAMPLES

I Preparation

EXAMPLE 1 (B1)

Preparing a Polycarbonate Acrylate From Hexanediol 118 of diethyl carbonate and 236 g of hexanediol are charged to a reaction flask, and 4 of potassium hydroxide are added at room temperature. The flask is then heated to an external temperature of 135° C. 75 ml of ethanol are distilled off upto an internal temperature of 125° C. The reaction mixture is cooled, 7 of sulfuric acid are first added slowly, then 0.5 g of hydroquinone monomethyl ether, 0.5 g of Kerobit TBK, 0.25 g of CuCl, 288 g of acrylic acid and 140 g of cyclohexane. At an external temperature of 140 ° C., the mixture was heated on a water separator for 8 h, and about 75 g of water/acrylic acid mixture were removed. The solution was cooled, washed with NaCl and NaOH, and the solvent was removed by distillation. This gave a pale yellow colored liquid. The infrared spectrum show a carbonate band and an acrylate band. The compound contains on average 1 carbonate group and 2 acrylic groups.

Preparing a Weather-resistant Coating Material 30 parts of the polycarbonate acrylate prepared from hexanediol, and 4% by weight of the photoinitiator Darocure 1173 (Ciba Geigy), are added to 70 parts of a urethane acrylate prepared by reacting the ixocyanurate of hexamethylene diisocyanate with hydroxyethyl acrylate. The viscosity is 10.4 Pas.

Comparative Example 1: (C1)

A coating material is prepared as in Example 1, but hexanediol diacrylate is used instead of the polycarbonate acrylate.

Comparative Example 2: (C2)

A coating material is prepared as in Example 1, but tripropylene glycol diacrylate is used instead of the polycarbonate acrylate.

EXAMPLE 2 (B2)

A coating material is prepared as in Example 1 which additionally contains 0.5% of the photoinitiator Lucirin TPO, 2% of Tinuvin 400 (UV absorber) and 1% of Tinuvin 292 (HALS).

Comparative Example 3 (C3)

A coating material is prepared as in Example 2, but containing hexanediol diacrylate instead of the carbonate acrylate.

EXAMPLE 3 (B3)

11.8 g of diethyl carbonate, 28.8 g of cyclohexanedimethanol and 0.37 g of dibutoxydibutyltin are heated for 4 h at an external temperature of 150° C. The ethanol which forms is distilled off over a packed column with a return ratio of 10:1. After 4.6 g of ethanol have been removed by distillation the mixture is cooled to RT, 40 g of ethyl acrylate are added, and heating is carried out for 1 h at an external temperature of 120° C. After 20 g of ethanol have been distilled off, the excess ethyl acrylate was removed under reduced pressure at 70° C.

Viscosity: 4.4 Pas

II Performance Tests

Pendulum Attenuation

The coating materials are applied by knife coating in a film thickness (wet) of 100 µm to metal panels and are then exposed twice using a high-pressure mercury lamp (120 W/cm; lamp/panel distance 10 cm, belt speed m/min). The pendulum attenuation (DIN 53 157) is a measure of the hardness of the coating. It is stated in seconds (s), high values denoting high hardness.

Erichsen Indentation

The coating materials are applied and exposed as above except that the film thickness (wet) was 50 µm. The Erichsen indentation (DIN 53 156) is a measure of the flexibility and elasticity. It is stated in millimeters (mm), with high values denoting high flexibility.

Chemical Resistance

The coating materials are applied and exposed as above except that the film thickness (wet) was 60 µm. Drops of different chemicals were applied at different temperatures to the cured coating. After an exposure time of 24 h, a note is taken of the temperature above which damage to the film surface is first observed.

Reactivity

The coating materials were applied and exposed as described for the pendulum attenuation test. The belt speed was varied. A note is made of the belt speed at which through-curing still just takes place, i.e. when scratching the surface with a fingernail makes no impression.

Xenon Test

The coating material is applied to white basecoated metal panels using a 25 g spiral-wound coating bar, and is cured with UV light 2 times (belt speed: m/min).

The xenon test was then conducted in accordance with DIN 53387/89, with the samples rotating about the xenon lamp and being aligned continually toward the lamp. The period of irrigation is 18 minutes, the dry period 112 minutes per cycle.

The results are listed in the following Tables:

TABLE 1

Chemical resistance

| Chemical | B1 | C1 | C2 |
|---|---|---|---|
| pancreatin + $H_2O$ 1:1 | 62° C. | 60° C. | 53° C. |
| 5% strength aqueous NaOH | 40° C. | 40° C. | 40° C. |
| 10% strength aqueous $H_2SO_4$ | 43° C. | 40° C. | 42° C. |

The acid resistance in particular, which plays an important part in weather-resistant coating materials, is improved in the case of the coating material of Example 1.

TABLE 2

Mechanical properties and reactivity

|  | B1 | C1 | C2 |
|---|---|---|---|
| Pendulum attenuation (s) | 67 | 102 | 101 |
| Erichsen indentation (mm) | 4.8 | 2.4 | 4.3 |
| Reactivity (m/min) | 15 | 20 | 15 |

TABLE 3

Xenon Test (Weathering stability)

|  | B1 | C1 | C2 |
|---|---|---|---|
| Damage after h (cracking and/or loss of gloss) | >1400 | 1280 | 940 |

TABLE 4

Mechanical properties and reactivity

|  | B2 | C3 | B3 |
|---|---|---|---|
| Pendulum attenuation (s) | 60 | 95 | 101 |
| Erichsen indentation (mm) | 5.2 | 2.5 | 5.7 |
| Reactivity (m/min) | 5 | 5 | 5 |

TABLE 5

Xenon Test (Weathering stability)

|  | Exp. 2 | C3 | B3 |
|---|---|---|---|
| Damage after h (cracks and/or loss of gloss) | >2800 | >2800 | >2800 |

The comparison shows that weather-resistant coating materials with markedly improved flexibility are obtained.

What is claimed is:

1. A method for coating an exterior sector comprising applying to a substrate a radiation-curable composition comprising from 0.5 to 100% by weight, based on the overall amount of radiation-curable compounds, of aliphatic carbonate (meth)acrylates, wherein each of said aliphatic carbonate (meth)acrylates has on average from 1 to 5 carbonate groups and on average from 2 to 4 (meth)acrylate groups, as a coating composition, followed by curing said composition with TV radiation or electron beam radiation.

2. The method according to claim 1 wherein the carbonate (meth)acrylate is of the formula

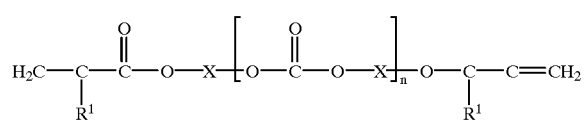

where $R^1$ is H or $CH_3$, X is a $C_2$–$C_{18}$ alkylene group and n is an integer from 1 to 5, preferably from 1 to 3.

3. The method as claimed in claim 1, wherein the content of carbonate (meth)acrylates in said composition is from 5 to 80% by weight.

4. The method as claimed in claim 1, where the carbonate (meth)acrylates are compounds having on average from 1 to 3 carbonate groups and 2 (meth)acrylic groups.

5. The method as claimed in claim 1, where the number-average molecular weight $M_n$ of the carbonate (meth)acrylates is less than 3000 g/mol.

6. The method as claimed in claim 1, where the radiation-curable composition comprises:
   from 5 to 80% by weight of carbonate (meth)acrylates a)
   from 20 to 95% by weight of urethane (meth)acrylates, epoxy (meth)acrylates or melamine (meth)acrylates b)
   from 0 to 50% by weight of compounds c) which have at least one (meth)acrylic group and are different from a) and b), and
   from 0 to 50% by weight of radiation-curable compounds d) without (meth)acrylic groups, based on the overall amount of radiation-curable compounds.

7. The method as claimed in claim 1 where the radiation-curable composition comprises:
   from 0 to 10 parts by weight of at least one photoinitiator
   from 0.1 to 5 parts by weight of at least one UV absorber and
   from 0.1 to 5 parts by weight of at least one free-radical scavenger,
   per 100 parts by weight of radiation-curable compounds.

8. The method of claim 1 wherein said substrate is a vehicle body.

9. The method of claim 1 wherein said substrate is a vehicle part.

10. The method of claim 1 wherein said radiation-curable composition is an automotive clearcoat, and wherein said substrate is a vehicle body or vehicle part.

11. A vehicle body or vehicle part coated according to the method as claimed in claim 1.

12. A radiation-curable composition comprising:
    from 5 to 80% by weight of aliphatic carbonate (meth)acrylates having on average from 1 to 5 carbonate groups and on average from 2 to 4 (meth)acrylic groups a)
    from to 20 to 95% by weight of urethane (meth)acrylates, epoxy (meth)acrylates or melamine (meth)acrylates b)
    from 0 to 50% by weight of compounds c) which have at least one (meth)acrylic group are different from a) and b), and
    from 0 to 50% by weight of radiation-curable compounds d) without (meth)acrylic groups,
    based on the overall amount of radiation-curable compounds.

13. A vehicle body or vehicle part coated with a radiation-curable composition as claimed in claim 12.

14. The composition according to claim 12, wherein the number-average molecular weight $M_n$ of the carbonate (meth)acrylates is less than 3000 g/mol.

15. The method according to claim 13, wherein the carbonate (meth)acrylate

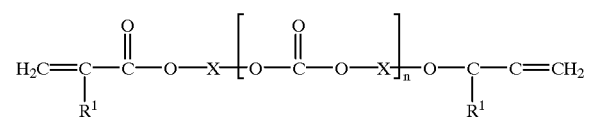

is of the formula
   where $R^1$ is H or $CH_3$, X is a $C_2$–$C_{18}$ alkylene group and n is an integer from 1 to 5, preferably from 1 to 3.

16. The composition according to claim 12, wherein the number average molecular weight $M_n$ of the carbonate (meth)acrylates is less than 3000 g/mol.

* * * * *